United States Patent
Medina

[11] Patent Number: 6,053,810
[45] Date of Patent: Apr. 25, 2000

[54] DOMESTIC GAS DETECTION AND EXPULSION APPLIANCE

[76] Inventor: Manuel Sierra Medina, Marroquina, 86, E-28030 Madrid, Spain

[21] Appl. No.: 09/125,668
[22] PCT Filed: Dec. 23, 1997
[86] PCT No.: PCT/ES97/00310
§ 371 Date: Aug. 20, 1998
§ 102(e) Date: Aug. 20, 1998
[87] PCT Pub. No.: WO98/28577
PCT Pub. Date: Jul. 2, 1998

[30] Foreign Application Priority Data

Dec. 23, 1996 [ES] Spain ................................ 9603293 U
Dec. 19, 1997 [ES] Spain ................................ 9703291 U

[51] Int. Cl.$^7$ ................................................ F24F 7/007
[52] U.S. Cl. ............................................................ 454/343
[58] Field of Search .................................... 454/342, 343

[56] References Cited

U.S. PATENT DOCUMENTS 3,210,547  10/1965  Iliot ..................................... 454/343 X
3,826,180  7/1974  Hayashi .
3,950,155  4/1976  Komiyama .

FOREIGN PATENT DOCUMENTS 953 006  8/1974  Canada .
27 28 466  1/1979  Germany .

*Primary Examiner*—Harold Joyce
*Attorney, Agent, or Firm*—Gifford, Krass, Groh, Sprinkle, Anderson & Citkowski, P.C.

[57] ABSTRACT

A device for gas detection and exhaustion includes a housing having a duct with an inlet and at least one outlet. A motor having a casing mounted on a housing includes a shaft extending into the duct and propeller means mounted to the shaft for exhausting a gas from the duct. A sealing means associated with the motor and the casing effectively seals the motor from the atmosphere. A gas detector operatively disposed in the housing detects undesirable gas, the detector is operatively connected to an actuating means for actuating the motor when the undesirable gas is detected.

8 Claims, 4 Drawing Sheets

DOMESTIC GAS DETECTION AND EXPULSION APPLIANCE

This invention is made up of a device combining a triple function for detecting dangerous gas leaks, warning of its presence via audio-visual alarms and extracting surplus gas detected to the outside.

In the state-of-the-art where this invention resides, referring to gas leak safety appliances, detectors fitted with alarms activated by a certain level of gas build-up are known.

However, none of such known detectors includes the function of extracting the gas from the place where build-up has been detected, as this invention does.

This invention combines such functions into a small sized appliance, particularly conceived for fitting in house kitchens and small rooms.

Manufacturing costs involved in this invention are low, meaning that it can be afforded by any consumer and the simplicity of its components makes very low cost repairs possible.

The invention is particularly recommended for houses, flats or premises which are uninhabited for long periods of time, where conventional gas leak detectors are ineffective because activation of their audio-visual alarms does not eliminate the risk of gas which is continuing to build up exploding unless someone on the outside perceives the alarms and proceeds to ventilate the room where gas has accumulated.

In the face of such risk situations, this invention proffers the functional advantage of the fact that the actual device being claimed, after detecting gas and activating its audio-visual alarms, without the user or third parties intervening, automatically extracts the accumulated gas and eliminates the risk of an explosion in the dwelling or gas poisoning of people in the vicinity who, because of some physical handicap such as deafness, or through listening to high volume music or watching the television with the sound high had not perceived the acoustic alarms or are in other rooms and cannot see the visual alarm displays.

This invention offers such functional advantages, as it embodies in its small sized casing a fan for expelling gas detected by the device itself to the outside. The fan blades are driven by the shaft of a motor hermetically encapsulated in a place separated from the duct where the gas runs when expelled. This removes the risk of fire from gas coming into contact with some spark caused by the running motor, particularly as the fan shaft point of connection with the motor's encapsulated space is also sealed.

Due to providing for the appliance's motor to be encapsulated and that the appliance has to be on the same horizontal plane centred with respect to the fan and the grill for sucking out gas accumulated inside the dwelling, this appliance's extractor duct, seen in an elevated side section, describes a curved trajectory with an inflection point until it links with the outside grill.

As an alternative, to improve the appliance's extracting function capacity, the invention provides for the gas expulsion duct to separate or branch off, after a common commencement at the inside grill, into two or more gas extraction channels, also with a curved side cross section with an inflection point.

These branched ducts run opposite to each other in diametrically opposed, equidistant trajectories, enclosing an inside space between them where the sealed encapsulated motor is housed which, in this alternative, is positioned with a 90° turn or slope with respect to its position in the alternative of a single extraction duct.

A sheet of drawings where non-limiting examples of this invention's embodiment can be seen is attached for better understanding of this invention's functionality as described.

Figure 1:
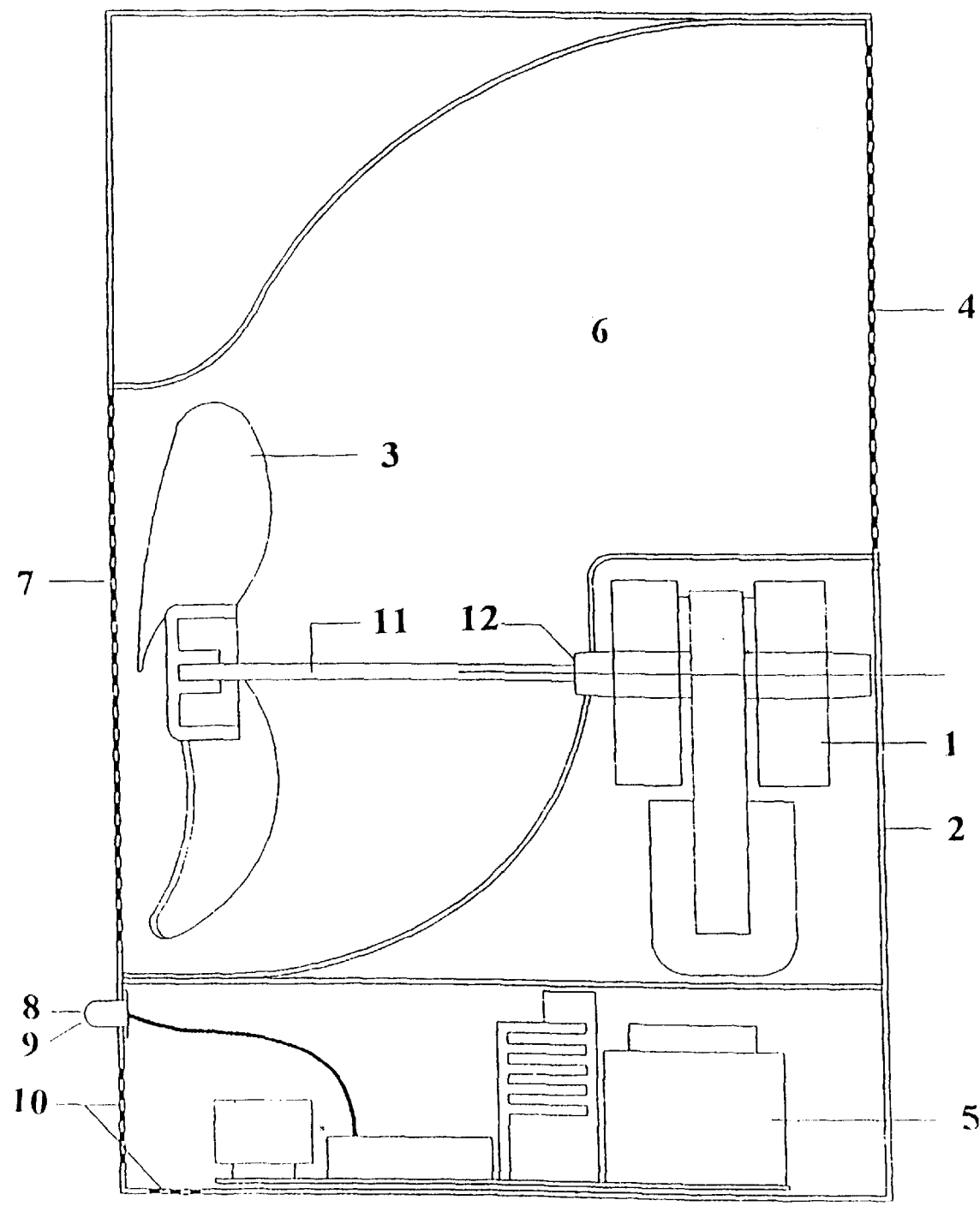
FIG. 1 shows a cross section in side elevation of the invention.
Figure 2:
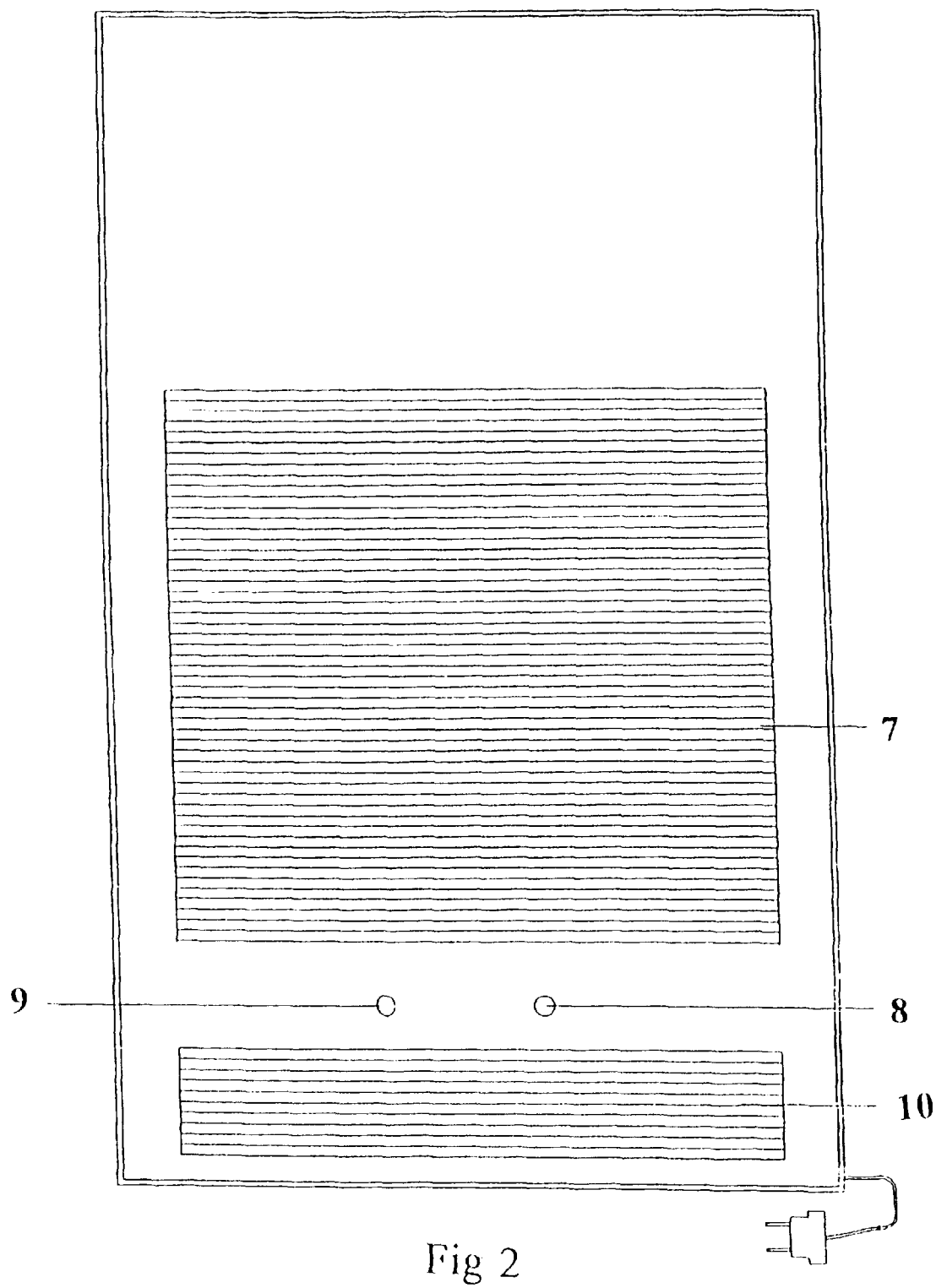
FIG. 2 shows the front of the device claimed viewed from inside the dwelling where installed.
Figure 3:
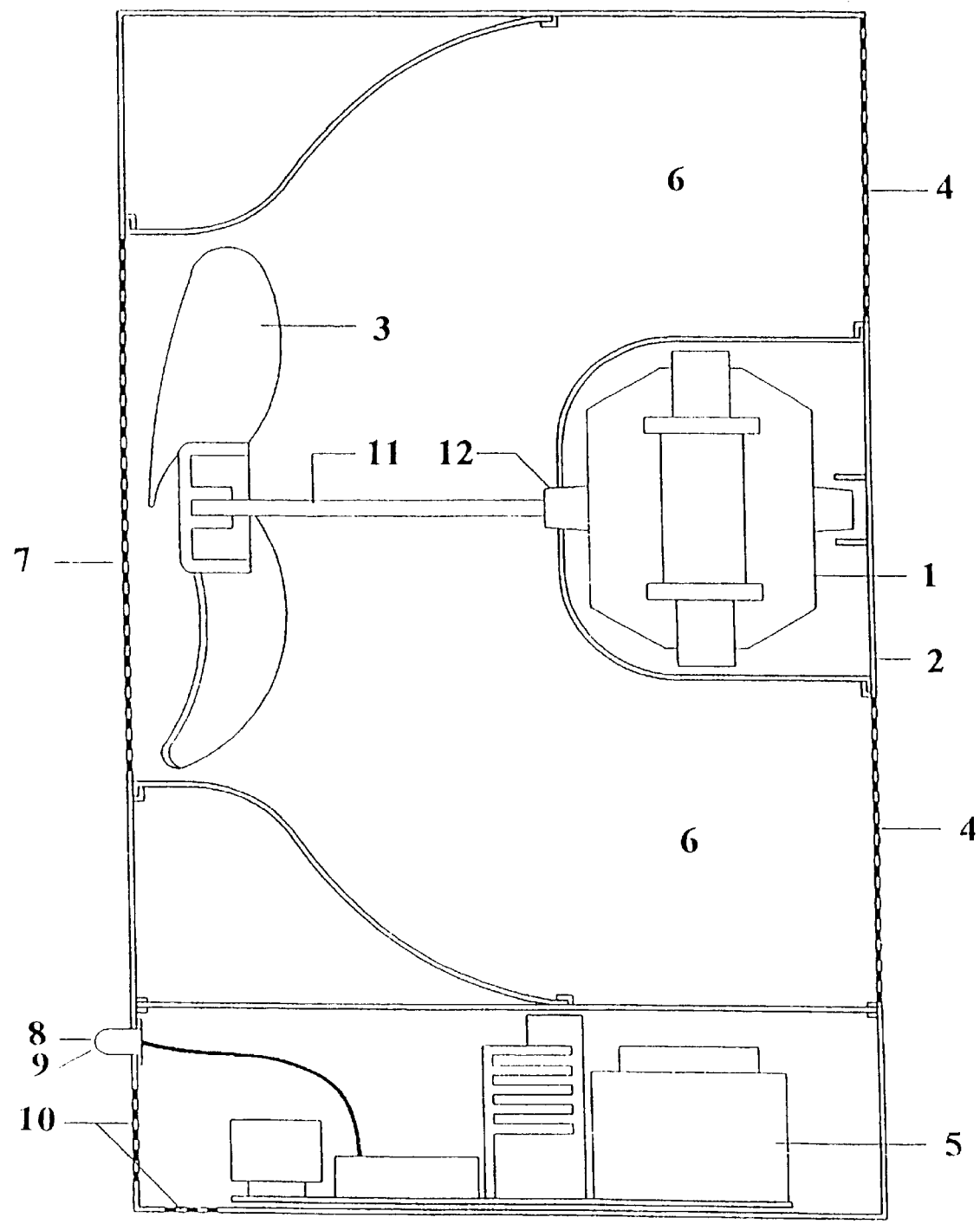
FIG. 3 shows the alternative to this invention, with the same cross section as FIG. 1, made up of a branching off of its inside channel.
Figure 4:
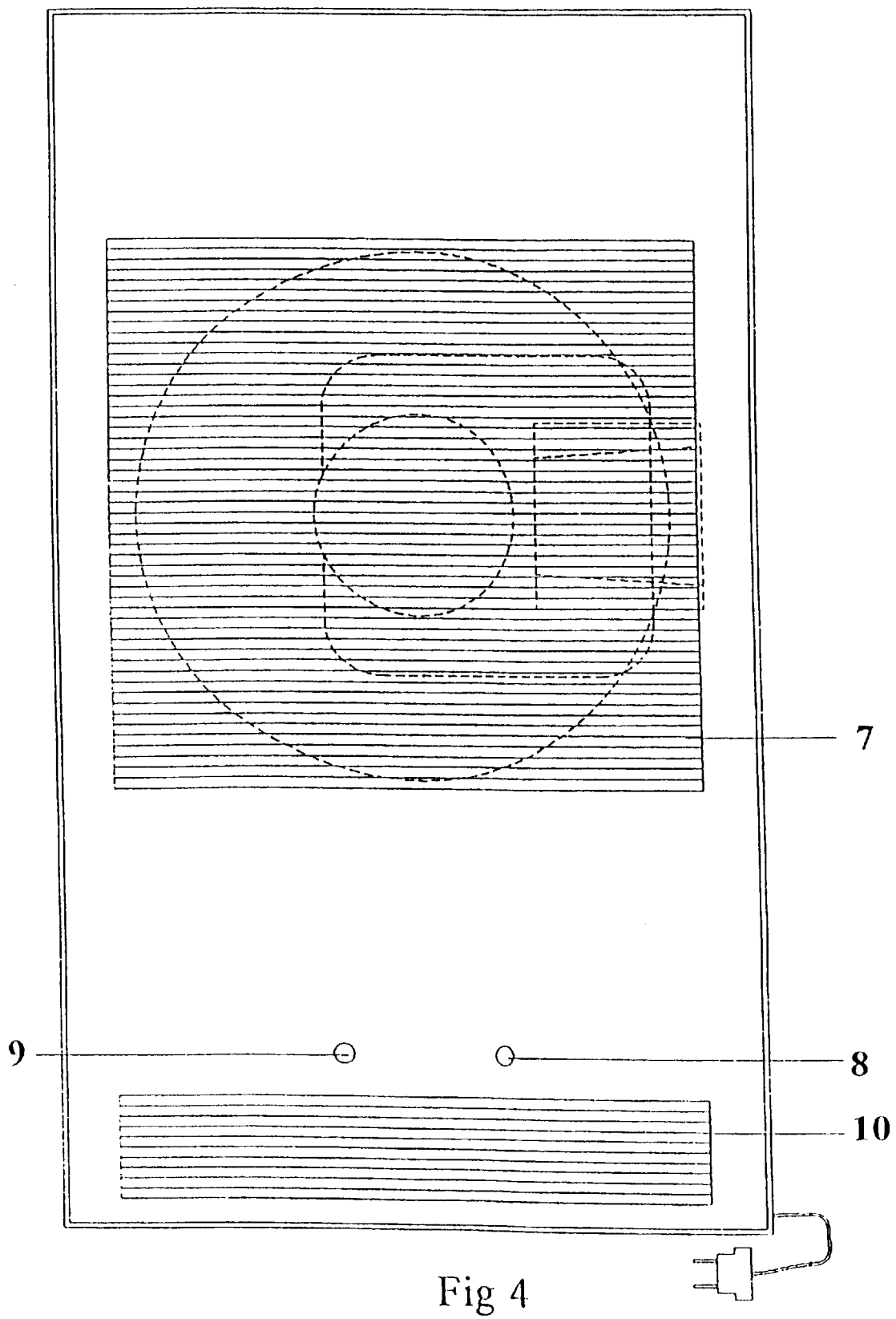

FIG. 4 gives a view of the invention alternative in FIG. 3 from inside the dwelling where the device is located.

All these figures show the encapsulated motor (1), located inside the casing (2) preferably prismatic-rectangular in shape which structures this gas detector-extractor. Such motor (1) moves the fan blades (3) located facing the grill opening (7) which is directly visible from inside the dwelling where this appliance is installed.

In the extraction operation, the gas sucked in by the fan (3) from inside the dwelling for expelling to the outside through the grill (4) enters the appliance through the grill (7) and crosses the expulsion duct (6) which, in its side cross section, adopts a peculiar curved trajectory with a point of inflection, especially conceived for placing the encapsulated motor (1) with respect to the fan (3) opposite on the same horizontal plane.

The encapsulated motor is located in a sealed housing into which the gas running through the expulsion duct (6) cannot enter. The point of connection (12) between the fan shaft (11) and the motor's encapsulated space (1) is especially sealed for perfect isolation.

The gas detector (5) which is activated by gas accumulation located through the grill (10) starts up the encapsulated motor (1) which, in turn, drives the fan (3) through its shaft (11).

The device's acoustic and visual alarms are simultaneously activated. The device's front visible from inside the dwelling displays two light indicators, one for the alert state (8) of the device, which is continuously on to confirm its correct operation, and a second danger indicator (9) which comes on when gas is detected, together with the acoustic alarm.

The Figures show the alternative for this invention involving the extractor duct (6), after a short stretch from the grill (7) branching into two identical channels (6) which likewise describe curved trajectories in a side cross section with a point of inflection. They are diametrically opposite and equidistant. Each of the channels (6) end in respective, separate outside grills (4).

The branching channels (6) enclose an inside space where the motor (1) is housed. In comparison with its placing in the alternative with a single duct (6), the latter appears turned through 90° and displaced towards the appliance's top area. This displacement correlatively affects the inside grill (7) due to the fact that this opening in the casing (2) coincides in the centre in the same horizontal plane with the shaft (11) of the fan (3) and, in turn, with the motor (1).

The aforedescribed is a faithful reflection of this invention and it must be considered that its characteristics have been expounded in a broad but non-limiting sense, and the circumstances of a merely formal, secondary or accessory nature which do not alter the essential nature claimed hereafter are indifferent and changing.

What is claimed is:

1. A device for gas detection and exhaustion said device comprising:

a housing having a duct, said duct having an inlet and at least one outlet;

a motor having a casing mounted on said housing, said motor having a shaft extending into said duct and propeller means mounted to said shaft for exhausting a gas from said duct;

sealing means associated with said motor shaft and said casing effectively sealing said motor from the atmosphere;

a gas detector operatively disposed in said housing for detecting an undesirable gas; and actuating means operatively connected to said detector for actuating said motor when the undesirable gas is detected.

2. A device according to claim 1, wherein said device includes a warning light operatively connected to said detector.

3. A device according to claim 1, wherein said device includes an audible alarm operatively connected to said detector.

4. A device according to claim 1, wherein said duct has an essentially "Z" shaped cross-section.

5. A device according to claim 1, wherein said device includes an indicator light operatively connected to said device indicating that said device is in operable condition.

6. A device according to claim 1, wherein said duct includes two identical branches having an inlet at one end thereof and culminating in dual outlets, at the other end thereof.

7. A device according to claim 1, wherein said one inlet and said at least one outlet include screens disposed thereover.

8. A device according to claim 1, wherein a portion of said duct forms at least part of said motor casing.

* * * * *